(12) United States Patent
Owejan et al.

(10) Patent No.: US 8,877,392 B2
(45) Date of Patent: Nov. 4, 2014

(54) PEM FUEL CELL STACK INLET WATER REGULATION SYSTEM

(75) Inventors: Jon P. Owejan, Honeoye, NY (US); Thomas A. Trabold, Pittsford, NY (US); William H. Pettit, Rochester, NY (US); Thomas W. Tighe, Bloomfield, NY (US); James M. Keogan, Lima, NY (US); Eric J. Connor, Rochester, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 623 days.

(21) Appl. No.: 12/551,600

(22) Filed: Sep. 1, 2009

(65) Prior Publication Data

US 2011/0053011 A1 Mar. 3, 2011

(51) Int. Cl.
*H01M 8/06* (2006.01)
*H01M 8/04* (2006.01)
*H01M 8/24* (2006.01)
*H01M 8/10* (2006.01)

(52) U.S. Cl.
CPC ........ *H01M 8/2485* (2013.01); *H01M 8/04253* (2013.01); *H01M 8/04156* (2013.01); *H01M 8/242* (2013.01); *H01M 8/04171* (2013.01); *H01M 2008/1095* (2013.01); *Y02E 60/50* (2013.01); *H01M 8/04291* (2013.01)
USPC .......................................... 429/413; 429/450

(58) Field of Classification Search
CPC ............ H01M 8/0247; H01M 8/0254; H01M 8/0256; H01M 8/04141; H01M 8/04156
USPC .................. 429/413, 414, 454–461, 450–451
See application file for complete search history.

(56) References Cited

U.S. PATENT DOCUMENTS

| 7,192,668 | B2 * | 3/2007 | Dehne | ........................... 429/414 |
| 2003/0044670 | A1 * | 3/2003 | Walsh | ............................. 429/34 |
| 2006/0134482 | A1 * | 6/2006 | Gunther et al. | .................. 429/26 |
| 2008/0118809 | A1 * | 5/2008 | Tighe et al. | ..................... 429/34 |
| 2008/0182148 | A1 * | 7/2008 | Skala | .............................. 429/34 |

FOREIGN PATENT DOCUMENTS

| CN | 101242005 A | 8/2008 |
| DE | 10304657 A1 | 9/2003 |
| DE | 102010009004 A1 | 12/2010 |

OTHER PUBLICATIONS

Fuel Cell Vaporization Unit 482127, Disclosed anonymously.

* cited by examiner

*Primary Examiner* — Barbara Gilliam
*Assistant Examiner* — Robert S Carrico
(74) *Attorney, Agent, or Firm* — Fraser Clemens Martin & Miller LLC; J. Douglas Miller

(57) ABSTRACT

A fuel cell stack assembly is disclosed that includes a porous member disposed within a flow path for a reactant. A fluid collection member is provided within the flow path adjacent to and in fluid communication with the porous member. The porous member and the fluid collection member cooperate to collect liquid water from the reactant flowing in the flow path, wherein the collected liquid water may be drained from the fluid collection member.

20 Claims, 4 Drawing Sheets

PEM FUEL CELL STACK INLET WATER REGULATION SYSTEM

FIELD OF THE INVENTION

The present disclosure relates to a fuel cell stack and more particularly to a fuel cell stack including a system to regulate water entrained in a reactant supply stream.

BACKGROUND OF THE INVENTION

Fuel cell power systems convert a fuel and an oxidant (reactants) to electricity. One type of fuel cell power system employs a proton exchange membrane (PEM) to catalytically facilitate reaction of the fuel (such as hydrogen) and the oxidant (such as air or oxygen) to generate electricity. Water is a byproduct of the electrochemical reaction. The PEM is a solid polymer electrolyte that facilitates transfer of protons from an anode electrode to a cathode electrode in each individual fuel cell of a stack of fuel cells normally deployed in a fuel cell power system.

In the typical fuel cell assembly, the individual fuel cells have fuel cell plates with channels, through which various reactants and cooling fluids flow. Fuel cell plates may be unipolar, for example. A bipolar plate may be formed by combining unipolar plates. The oxidant is supplied to the cathode electrode from a cathode inlet header and the fuel is supplied to the anode electrode from an anode inlet header. Movement of water from the channels to an outlet header is typically caused by the flow of the reactants through the fuel cell assembly. Boundary layer shear forces and a pressure of the reactant aid in transporting the water through the channels until the water exits the fuel cell through the outlet header.

A membrane-electrolyte-assembly (MEA) is disposed between successive plates to facilitate the electrochemical reaction. The MEA includes the anode electrode, the cathode electrode, and an electrolyte membrane disposed therebetween. Porous diffusion media (DM) are positioned on both sides of the MEA to facilitate a delivery of reactants for the electrochemical fuel cell reaction.

Water accumulation within the channels of the fuel cell can result in a degradation of a performance of the fuel cell. Particularly, water accumulation causes reactant flow maldistribution in individual fuel cell plates and within the fuel cell assembly, which can lead to voltage instability and a degradation of the electrodes. Additionally, water remaining in the fuel cell after operation may solidify in sub-freezing temperatures, creating difficulties during a restart of the fuel cell. Water accumulating in the channel regions includes the water byproduct of the electrochemical reaction and water entrained in the reactant flow streams from the cathode inlet header and the anode inlet header.

Numerous techniques have been employed to manage water accumulation within the fuel cell. These techniques include pressurized purging, gravity flow, and evaporation, for example. Additionally, the use of water transport structures and surface coatings have been employed that facilitate the transport of water from the channel regions of the fuel cell into an exhaust region of the fuel cell assembly, for example. The methods to manage water accumulation typically focus on removal of water that has accumulated within the channels of the fuel cell and require additional operational steps and/or components for the fuel cell. The additional operational steps and components are known to reduce an efficiency of operating the fuel cell and increase a cost of manufacturing the fuel cell. Water entrained in the reactant flow streams increases a need to employ the various techniques, transport structures, and surface coatings to facilitate removal of water from the tunnel regions of the fuel cell.

It would be desirable to produce a cost effective fuel cell stack that minimizes an accumulation of water within a fuel cell and the number of required components to facilitate a removal of water from the fuel cell.

SUMMARY OF THE INVENTION

Compatible and attuned with the present invention, a cost effective fuel cell stack that minimizes an accumulation of water within a fuel cell and the number of required components to facilitate a removal of water from the fuel cell, has been surprisingly discovered.

In one embodiment, a fluid regulation system for a fuel cell stack comprises a porous element disposed in a fluid inlet of the fuel cell stack effective to collect a liquid water from a reactant gas flowing therethrough; and a fluid collection member disposed in the fluid inlet, the fluid collection member in fluid communication with the porous element.

In another embodiment, a fuel cell stack assembly comprises a first end plate and a spaced apart second end plate; at least one fuel cell disposed between the first end plate and the second end plate; a fluid inlet providing a flow path for a reactant gas to the at least one fuel cell; a porous element disposed in the fluid inlet, wherein the reactant gas is caused to flow through the porous element and into the at least one fuel cell, the porous element effective to collect a liquid water from the reactant gas flowing therethrough; and a fluid collection member disposed in the fluid inlet and adapted to receive the liquid water from the porous element.

In another embodiment, a method of regulating liquid water flowing into a fuel cell comprises the steps of providing a first end plate and a spaced apart second end plate; providing at least one fuel cell between the first end plate and the second end plate; providing a fluid inlet in fluid communication with the at least one fuel cell to provide a flow of a reactant gas to the at least one fuel cell; providing a porous element in the fluid inlet effective to collect a liquid water from the reactant gas flowing therethrough; and providing a fluid collection member in the fluid inlet adapted to receive the liquid water from the porous element.

DRAWINGS

The above, as well as other advantages of the present invention will become readily apparent to those skilled in the art from the following detailed description, particularly when considered in the light of the drawings described hereafter.

DETAILED DESCRIPTION OF THE INVENTION

Figure 1:
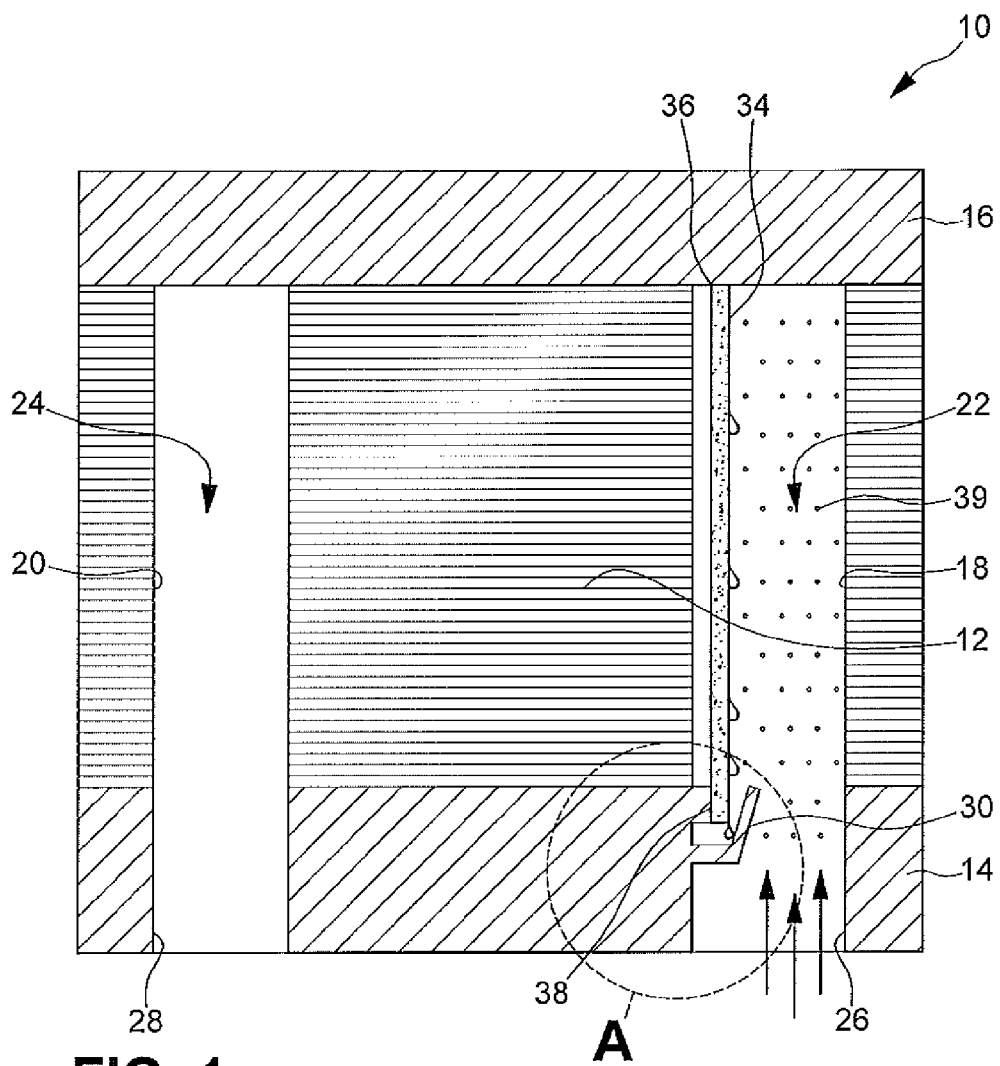
FIG. 1 is a schematic cross-sectional elevational view of a fuel cell stack according to an embodiment of the invention.

The following description is merely exemplary in nature and is not intended to limit the present disclosure, application, or uses. It should also be understood that throughout the drawings, corresponding reference numerals indicate like or corresponding parts and features.

FIG. 1 shows a fuel cell assembly 10 according to an embodiment of the present disclosure. The fuel cell assembly 10 includes a plurality of stacked fuel cells 12 disposed between end plates 14, 16. Each of the fuel cells 12 includes a pair of fuel cell plates (not shown) including an inlet port 18 and an outlet port 20 formed therein. The fuel cells 12 are stacked with the inlet port 18 and the outlet port 20 of each fuel cell 12 substantially aligned with the respective inlet port 18 and the outlet port 20 of an adjacent fuel cell 12. Collectively, the inlet ports 18 of each of the fuel cells 12 form an inlet header 22 and the outlet ports 20 of each of the fuel cells 12 form an outlet header 24. The inlet header 22 is adapted to provide a flow of a reactant such as a fuel (such as hydrogen) from a source of fuel or an oxidant (such as air or oxygen) from a source of oxidant, for example, to the fuel cells 12. The fuel cell assembly 10 shown is illustrative of both an anode inlet header and an anode outlet header (for the fuel), and a cathode inlet header and a cathode outlet header (for the oxidant).

The end plate 14 includes an inlet 26 formed therein in fluid communication with the inlet header 22 and an outlet 28 formed therein in fluid communication with the outlet header 24. An inlet conduit (not shown) provides fluid communication from the source of the reactant to the inlet 26 of the end plate 14. The inlet conduit, the inlet 26 of the end plate 14, and the inlet header 22 form a fluid inlet from the source of the reactant to the fuel cells 12. It should be understood that the fuel cell assembly 10 typically includes a coolant inlet header in fluid communication with a coolant inlet formed in an end plate, and a coolant outlet header in fluid communication with a coolant outlet formed in an end plate.

Figure 2:
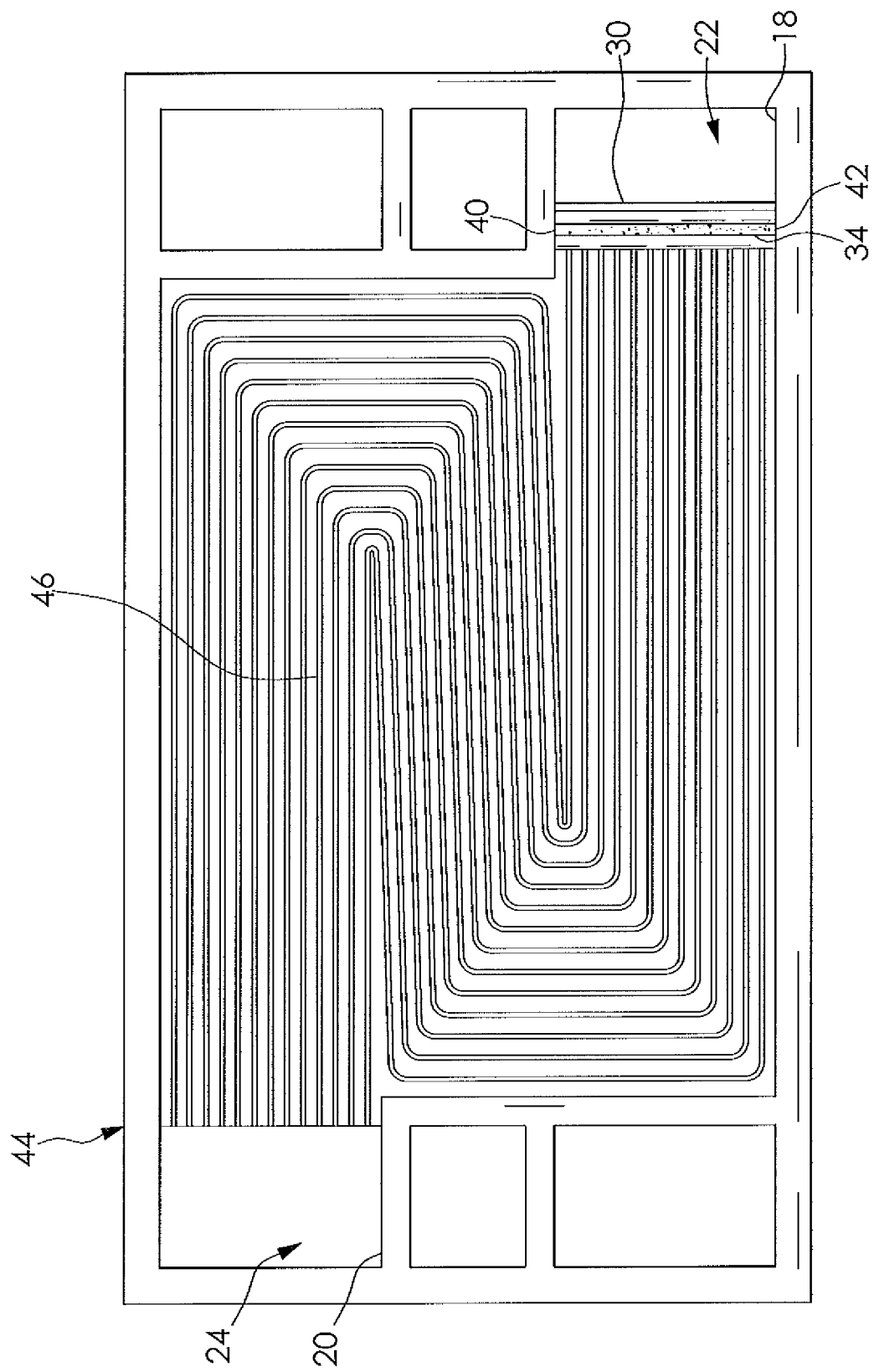
FIG. 2 is top plan view of the fuel cell stack illustrated in FIG. 1 with an end plate removed.

A fluid collection member 30 is provided in the inlet 26 of the end plate 14. In the illustrated embodiment, the fluid collection member 30 is a gutter extending outwardly from a surface of the inlet 26 of the end plate 14. A porous element 34 having a first end 36, a spaced apart second end 38, and opposing side edges 40, 42 shown in FIG. 2, is disposed within the inlet header 22. The first end 36 abuts a surface of the end plate 16 and the second end 38 abuts a surface of the end plate 14 adjacent the fluid collection member 30. The side edges 40, 42 abut opposing sides of the inlet header 22. The porous element 34 can be a foam, a mesh, a net, or any other material having suitable hydrophilic properties. Further, the porous element 34 can include a support structure such as a lattice, for example, to provide a desired rigidity or shape to the porous element 34. The porous element 34 is adapted to permit the flow of the reactant through the porous element 34 and into the fuel cells 12 while causing a liquid water 39 entrained in the reactant to collect therein and/or thereon. Favorable results have been obtained employing a hydrophilic material for the porous element 34. The side edges 40, 42 of the porous element 34 can be received between the fuel cells 12 to militate against fluids bypassing the porous element 34 by flowing around the side edges 40, 42 into the fuel cells 12. It should be understood that a seal member can be employed to form a substantially fluid tight seal between the side edges 40, 42 of the porous element 34 and the surface of the inlet header 22 and/or the fuel cells 12. Additionally, it should be understood that the seal member can be employed to form a substantially fluid tight seal between the first end 36 and the second end 38 of the porous element 34 and the end plate 16 and the end plate 14, respectively.

FIG. 2 shows the fuel cell assembly 10 with the end plate 16 removed to show a surface of a fuel cell plate 44 for one of the fuel cells 12. Each fuel cell plate 44 in the fuel cell assembly 10 includes a flow field 46 formed thereon including a plurality of flow channels that provide fluid communication from the inlet header 22 across the surface of the fuel cell plate 44 to the outlet header 24. The porous element 34 is disposed in the inlet header 22 adjacent an inlet to the flow field 46. It should be understood that the porous element 34 and the fluid collection member 30 can be employed in either a cathode inlet header or an anode inlet header.

In use, the reactant is caused to flow from the source through the inlet conduit and the inlet 26 of the end plate 14 into the inlet header 22. The reactant flowing through the inlet header 22 is caused to pass through the porous element 34 prior to being received in the flow field 46 of the fuel cell plates 44 of the fuel cells 12. As the reactant passes through the porous element 34, the water 39 entrained therein is collected by the porous element 34 and/or collected thereon, which minimizes water entering the fuel cells 12 from the inlet header 22. The porous element 34 is formed from a material having a selected water collecting characteristic to militate against liquid water from entering the fuel cells 12. Further, the porous element 34 can be formed from a material having a selected resistance to a flow of fluid therethrough to provide a desired fluid pressure change across the porous element 34 to facilitate forming a desired flow distribution of the reactant into the fuel cells 12.

The fluid collection member 30 provides for a collection of the water 39 entrained in the reactant. The water 39 collected by the porous element 34 can drain into the fluid collection member 30 by gravitational force. A capacity of the fluid collection member 30 can be selected to accommodate a desired amount of water and militate against the collected water, whether in liquid or solid form, from interfering with a flow of the reactant to the fuel cells 12 adjacent the fluid collection member 30. During periods of operation of the fuel cell assembly 10 when the relative humidity of the reactant is below the selected maximum relative humidity, liquid water is evaporated from the porous element 34 into the reactant. Liquid water in the fluid collection member 30 can be reabsorbed by the porous element 34 and evaporated into the reactant flowing therethrough.

The porous element 34 and the fluid collection member 30 cooperate to minimize and/or regulate the quantity of the water 39 entering the fuel cells 12 from the inlet header 22. The porous element 34 also facilitates a uniform distribution of the water 39 entering the fuel cells 12 from the inlet header 22. Regulating the water 39 entering the fuel cells 12 minimizes an accumulation of liquid water in the flow field 46 of the fuel cell plates 44 which can disrupt the flow of the reactant therethrough. By minimizing disruptions in the flow of the reactant through the flow field 46 of the fuel cell plates 44, electrode degradation and other failure mechanisms of the fuel cell assembly 10 are minimized, and electrical voltage stability and efficient operation of the fuel cell assembly 10 are maximized. Additionally, by minimizing an accumulation of liquid water in the flow field 46 of the fuel cell plates 44, the likelihood that frozen water will form therein during periods of low temperature operation of the fuel cell 10 such as a start-up period, for example, is also minimized. Frozen water in the flow field 46 of the fuel cell plates 44 can disrupt the flow of the reactant and cause a degradation of the components of the MEA by placing an increased compressive force thereon as a result of the volumetric expansion associated with the freezing of water. Accordingly, minimizing the accumulation of liquid water in the flow field 46 of the fuel cell plates 44 can minimize a likelihood of frozen water form disrupting the flow of the reactants therethrough or causing a degradation of the components of the MEA. Further, by minimizing and/or regulating the quantity of the water 39 entering the fuel cells 12, processes and components for the fuel cell assembly 10 adapted to manage and/or remove water from the fuel cells 12 can be eliminated or minimized. The elimination or minimization of such processes and components can minimize a cost of manufacturing the fuel cell assembly 10 and/or the number of components required for the fuel cell assembly 10, and can maximize an operational efficiency of the fuel cell assembly 10.

Figure 3:
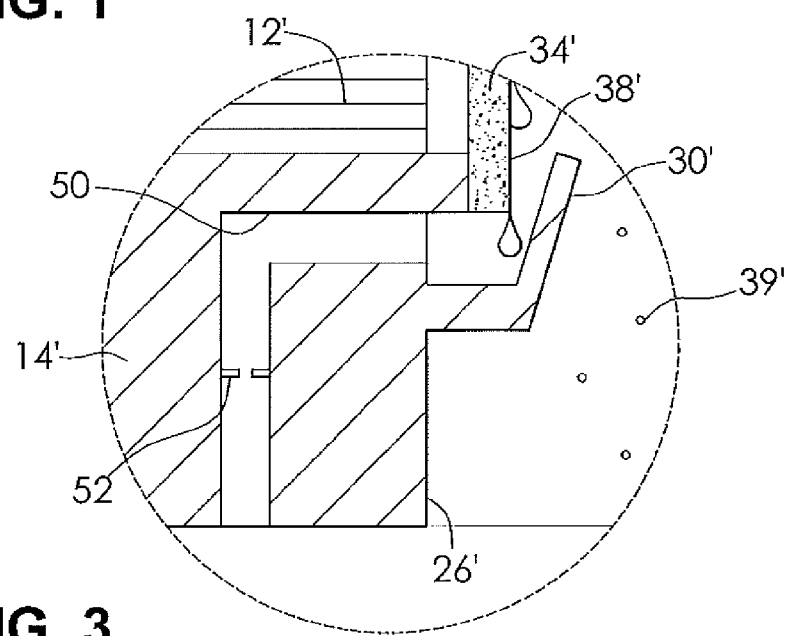
FIG. 3 is an enlarged fragmentary cross-sectional view of area A shown in FIG. 1 illustrating another embodiment of the invention.

FIG. 3 illustrates an alternate embodiment of the invention. Structure similar to that illustrated in FIG. 1 includes the same reference numeral and a prime (') symbol for clarity. In the embodiment shown, a fluid conduit 50 is formed adjacent and in fluid communication with the fluid collection member 30'. The fluid conduit 50 provides fluid communication between the fluid collection member 30' and a water exhaust conduit (not shown). In the illustrated embodiment, the fluid conduit 50 is formed in the end plate 14'. It should be understood that the fluid conduit 50 can be an elongate tube providing fluid communication between the fluid collection member 30' and the water exhaust conduit. A flow restrictor 52 such as a nozzle, for example, is provided within the fluid conduit 50 to regulate the flow of fluid through the fluid conduit 50.

In use, the fluid conduit 50 provides a flow path for liquid water collected in the fluid collection member 30' to exhaust therefrom. A fluid pressure of the reactant flowing through the inlet header 22' provides a driving force for the liquid water in the fluid collection member 30' to flow through the fluid conduit 50 to the water exhaust conduit. A quantity of reactant gas may also flow through the fluid conduit 50 which would reduce the quantity of reactant gas supplied to the fuel cells 12'. The flow restrictor 52 minimizes the flow of reactant through the fluid conduit 50 to minimize the quantity of the reactant gas that can bypass the fuel cells 12' and flow into the water exhaust conduit. The flow restrictor 52 can be adapted to restrict the flow of the reactant gas through the fluid conduit 50 to less than about 1% of the total flow of the reactant gas in the inlet header 22', while still causing liquid water to flow to the water exhaust line. It should be understood that an actuated valve can be employed with the fluid conduit 50 to selectively control the flow of fluid therethrough. The fluid conduit 50 and flow restrictor 52 are particularly effective for managing water in a cathode inlet header where a small quantity of cathode reactant, typically atmospheric air or oxygen, bypassing the fuel cells 12' is generally acceptable.

Figure 4:
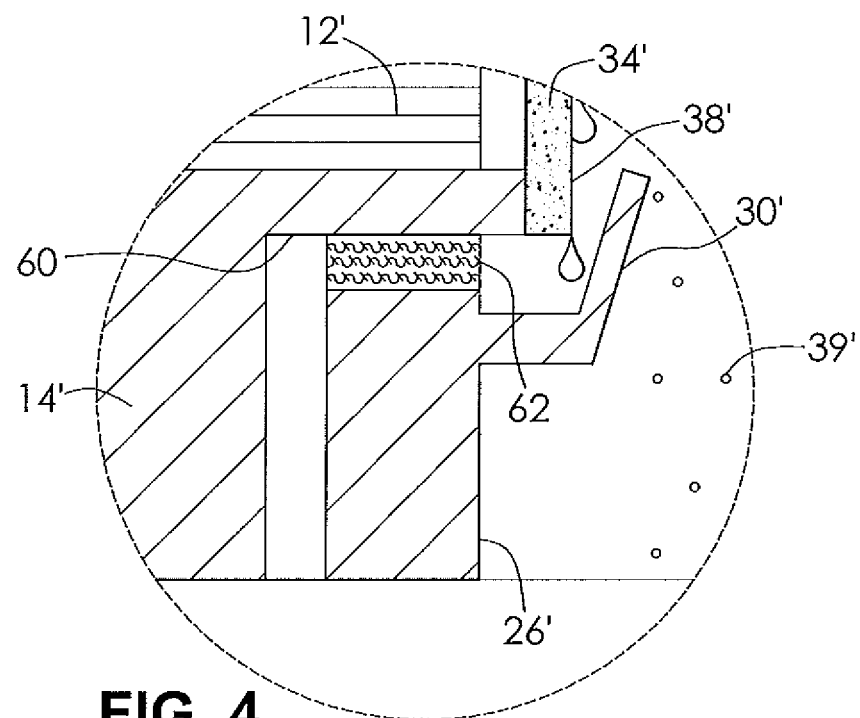
FIG. 4 is an enlarged fragmentary cross-sectional view of area A shown in FIG. 1 illustrating another embodiment of the invention.

FIG. 4 illustrates an alternate embodiment of the invention. Structure similar to that illustrated in FIG. 1 includes the same reference numeral and a prime (') symbol for clarity. As shown, a fluid conduit 60 is formed adjacent and in fluid communication with the fluid collection member 30'. The fluid conduit 60 provides fluid communication between the fluid collection member 30' and a water exhaust conduit (not shown). A wicking element 62 is disposed in the fluid conduit 60 which militates against the reactant gas from flowing through the fluid conduit 60 to the water exhaust conduit. In the illustrated embodiment, the fluid conduit 60 is formed in the end plate 14'. It should be understood that the fluid conduit 60 can be an elongate tube providing fluid communication between the fluid collection member 30' and the water exhaust conduit. Additionally, it should be understood that the fluid conduit 60 is not required and the wicking element 62 can be in fluid communication with the interior of the fluid collection member 30' and the water exhaust conduit directly.

In use, the fluid conduit 60 provides a flow path for liquid water collected in the fluid collection member 30' to exhaust therefrom. Liquid water in the fluid collection member 30' flows through the wicking element 62 disposed in the fluid conduit 60 by capillary forces. The liquid water flows through the wicking element 62 and then continues to flow through the fluid conduit 60 to the water exhaust conduit. Employing the wicking element 62 militates against reactant gas flowing through the fluid conduit 60 and bypassing the fuel cells 12'. The wicking element 62 is particularly suited for managing water in an anode inlet header where it is typically desired to have no reactant, typically hydrogen gas, bypass the fuel cells 12'.

Figure 5:
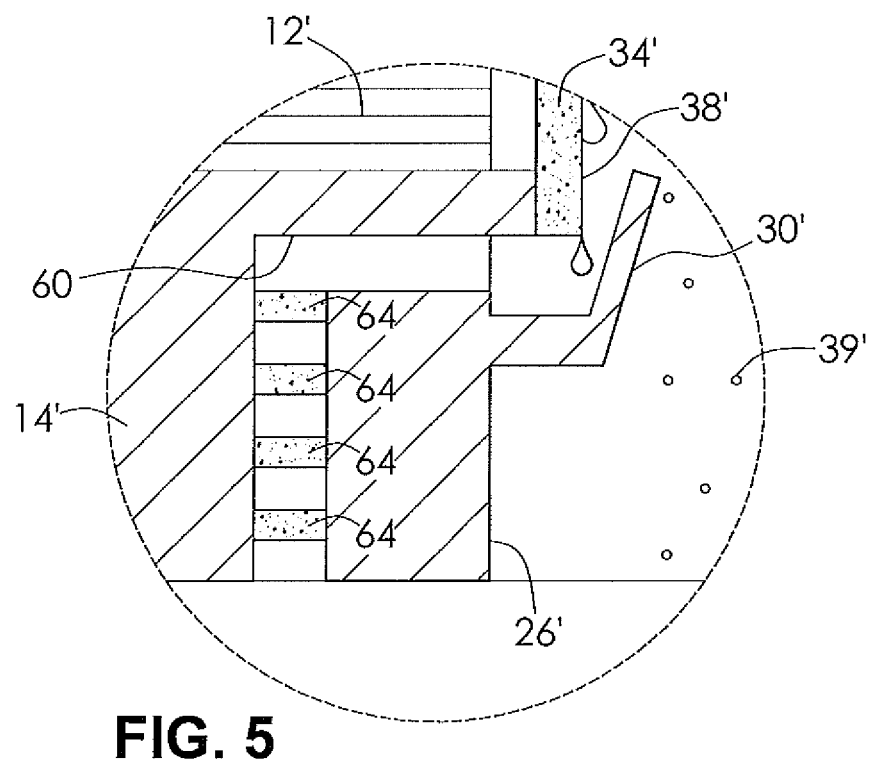
FIG. 5 is an enlarged fragmentary cross-sectional view of area A shown in FIG. 1 illustrating another embodiment of the invention.

In certain applications, the wicking element 62 may permit an amount of the reactant gas which exceeds a desired amount to flow into the water exhaust conduit and bypass the fuel cells 12' such as when the fluid pressure of the reactant gas exceeds a critical fluid pressure in respect of the wicking element 62, for example. It is anticipated that a critical fluid pressure for a typical wicking element 62 would be between about 10 kPa and 20 kPa. As shown in FIG. 5, in a fuel cell assembly 10' employing a reactant gas having a fluid pressure that exceeds the critical fluid pressure of the wicking element 62, the wicking element 62 can be replaced with a series of two or more spaced apart hydrophilic porous elements 64 disposed in the fluid conduit 60. Each hydrophilic porous element 64 provides a selected differential pressure thereacross. The series of the hydrophilic porous elements 64 is adapted to militate against the reactant gas passing therethrough while allowing liquid water to pass therethrough. Typically, the hydrophilic porous elements 64 are kept sufficiently wet with liquid water to maintain the desired differential pressure thereacross. Accordingly, at least a portion of the fluid conduit 60 including the hydrophilic porous elements 64 can be oriented in a horizontal position to facilitate retaining liquid water therein to keep the hydrophilic porous elements 64 sufficiently wetted. Further, liquid water can be provided to the hydrophilic porous elements 64 from water entrained in exhaust flowing from the outlet header and/or another suitable source of liquid water, for example. It should be understood that the flow restrictor 52, the wicking element 62, and the hydrophilic porous element 64 can be employed separately or in any combination thereof in the fluid conduit 60 to militate against the reactant gas from bypassing the fuel cells 12'.

Figure 6:
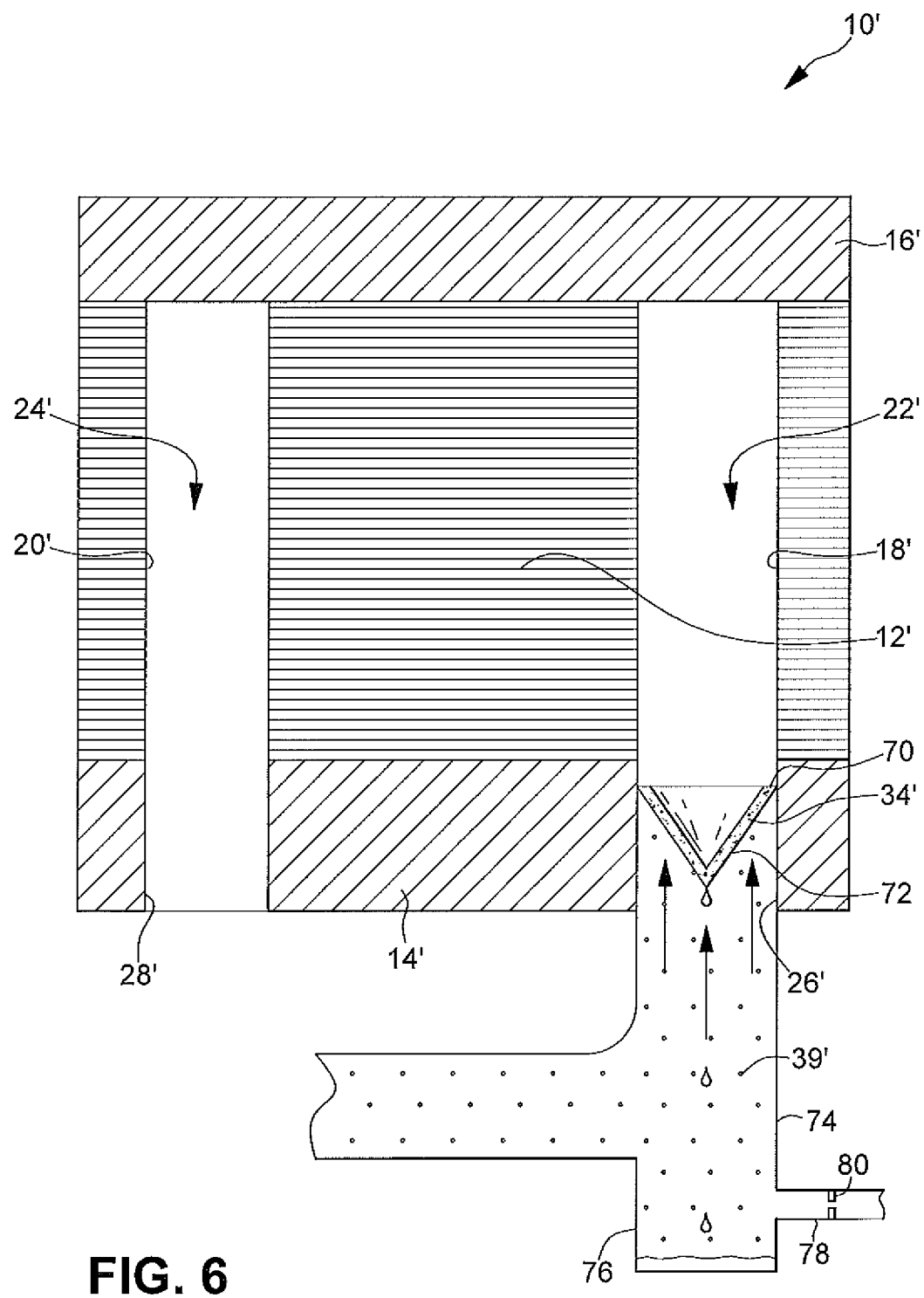
FIG. 6 is a schematic cross-sectional elevational view of a fuel cell stack illustrating another embodiment of the invention.

FIG. 6 illustrates an alternate embodiment of the invention. Structure similar to that illustrated in FIG. 1 includes the same reference numeral and a prime (') symbol for clarity. In the embodiment shown, the porous element 34' is disposed in the inlet 26' of the end plate 14'. The porous element 34' is a substantially cone shaped member having a peripheral edge 70 and a first surface 72. The peripheral edge 70 of the porous element 34' abuts a surface of the inlet 26'. It should be understood that other shapes can be employed for the porous element 34' such as a substantially planar member or other suitable curvilinear shapes, for example. An inlet conduit 74 is provided in fluid communication with the inlet 26' of the end plate 14'. The inlet conduit 74 includes a fluid collection member 76 having a fluid conduit 78 in fluid communication with the collection member 76 and a water exhaust conduit (not shown). A flow restrictor 80 such as a nozzle, for example, is provided within the fluid conduit 78 to militate against flow of the reactant gas therethrough.

In use, the inlet conduit 74 provides a flow path for the reactant gas to the inlet 26' of the end plate 14'. The reactant is caused to pass through the porous element 34' prior to being received by the inlet header 22'. The water 39' absorbed by or collected on the first surface 72 of the porous element 34' can flow by gravitational force into the fluid collection member 76. A fluid pressure of the reactant flowing through the inlet conduit 74 provides a driving force for the liquid water in the fluid collection member 76 to flow through the fluid conduit 78 to the water exhaust conduit. A quantity of reactant gas may also flow through the fluid conduit 78 which would reduce the quantity of reactant gas supplied to the fuel cells 12'. The flow restrictor 80 minimizes the flow of reactant through the fluid conduit 78 to minimize the quantity of the reactant gas that can bypass the fuel cells 12' and flow into the water exhaust conduit. The flow restrictor 80 can be adapted to restrict the flow of the reactant gas through the fluid conduit 78 to less than about 1% of the total flow of the reactant gas in the inlet header 22', while still causing liquid water to flow to the water exhaust line. It should be understood that an actuated valve can be employed with the fluid conduit 78 to selectively control the flow of fluid therethrough. It should be understood that the wicking element 62 and the hydrophilic porous elements 64 (illustrated in FIGS. 4 and 5, respectively), can be employed separately or in combination with each other and the flow restrictor 80 in the fluid conduit 78 to militate against the reactant gas bypassing the fuel cells 12'.

The porous element 34' in the embodiments illustrated in FIGS. 3-6 can be a hydrophilic or a hydrophobic material. When employing the hydrophobic material, the water 39 entrained in the reactant is collected on a surface of the hydrophobic material, forming water droplets thereon, which fall into the respective fluid collection members by gravitational force. The collected liquid water is exhausted to the water exhaust conduit. The use of a hydrophobic material is particularly effective when it is not desired to evaporate a substantial quantity of collected liquid water into the reactant entering the fuel cells 12' from the inlet header 22'. The remaining structure and function of the embodiments illustrated in FIGS. 3-6 is substantially equivalent to the structure and function of the embodiment illustrated in FIGS. 1-2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fluid regulation system for a fuel cell stack, the fuel cell stack including a plurality of fuel cells in a stacked orientation and positioned between opposing first and second end plates, the fluid regulation system comprising:
    a porous element having a first end and a second end, the porous element spanning a fluid inlet of the fuel cell stack, wherein the first end of the porous element abuts the first end plate and the second end of the porous element abuts the second end plate, the porous element effective to collect a liquid water from a reactant gas flowing therethrough, the porous element disposed in an inlet header adjacent an inlet to a flow field of a fuel cell of the fuel cell stack; and
    a fluid collection member extending from a surface of one of the first and second end plates and disposed in the fluid inlet directly adjacent the porous element, the fluid collection member in fluid communication with the porous element.

2. The system according to claim 1, wherein the porous element is formed from a hydrophilic material.

3. The system according to claim 1, further comprising a fluid conduit in fluid communication with the fluid collection member to provide a flow path to drain the liquid water from the fluid collection member.

4. The system according to claim 3, including a flow restrictor disposed in the fluid conduit to control a flow of the reactant gas therethrough.

5. The system according to claim 4, wherein the flow restrictor is one of a nozzle, a wicking material, and a hydrophilic porous element.

6. The system according to claim 3, wherein the porous element is formed from one of a hydrophilic material and a hydrophobic material.

7. The system according to claim 1, wherein the porous element collects a liquid water entrained in the reactant gas flowing through the porous element.

8. The system according to claim 7, wherein the liquid water collected is received in the fluid collection member.

9. The system according to claim 7, wherein the liquid water collected is evaporated into the reactant gas flowing therethrough.

10. The system according to claim 1, wherein the fluid inlet is one of an anode inlet and a cathode inlet.

11. A fuel cell stack assembly comprising:
    a first end plate and a spaced apart second end plate;
    at least one fuel cell disposed between the first end plate and the second end plate;
    a fluid inlet providing a flow path for a reactant gas to the at least one fuel cell;
    a porous element spanning the fluid inlet, wherein a first end of the porous element abuts the first end plate and a second end of the porous element abuts the second end plate, the porous element disposed in an inlet header adjacent an inlet to a flow field of the fuel cell, wherein the reactant gas is caused to flow through the porous element and into the at least one fuel cell, the porous element effective to collect a liquid water from the reactant gas flowing therethrough; and
    a fluid collection member extending from a surface of one of the first and second end plates and disposed in the fluid inlet directly adjacent the porous element, the fluid collection member adapted to receive the liquid water from the porous element.

12. The fuel cell stack assembly according to claim 11, wherein the porous element is adapted to selectively collect the liquid water entrained in the reactant gas flowing therethrough and evaporate the liquid water into the reactant gas flowing therethrough.

13. The fuel cell stack assembly according to claim 11, wherein the porous element is formed from a hydrophilic material.

14. The fuel cell stack assembly according to claim 11, wherein the inlet header is in fluid communication with the at least one fuel cell and the fluid inlet further comprises:
    an inlet formed in at least one of the first end plate and the second end plate, the inlet formed in at least one of the first end plate and the second end plate in fluid communication with the inlet header; and
    an inlet conduit in fluid communication with the inlet formed in the at least one of the first end plate and the second end plate, wherein the porous element spans one of the inlet header, the inlet formed in the at least one of the first end plate and the second end plate, and the inlet conduit, and the fluid collection member is disposed in one of the inlets formed in the at least one of the first end plate and the second end plate, and the inlet conduit.

15. The fuel cell stack assembly according to claim 11, further comprising a fluid conduit in fluid communication with the fluid collection member to provide a flow path to drain fluid from the fluid collection member.

16. The fuel cell stack assembly according to claim 15, including a flow restrictor disposed in the fluid conduit to control a flow of the reactant gas therethrough.

17. The fuel cell stack assembly according to claim 16, wherein the flow restrictor is one of a nozzle, a wicking material, and a hydrophilic porous element.

18. The fuel cell stack assembly according to claim 15, wherein the porous element is formed from one of a hydrophilic material and a hydrophobic material.

19. A method of regulating liquid water flowing into a fuel cell comprising the steps of:
   providing a first end plate and a spaced apart second end plate;
   providing at least one fuel cell between the first end plate and the second end plate;
   providing a fluid inlet in fluid communication with the at least one fuel cell to provide a flow of a reactant gas to the at least one fuel cell;
   providing a porous element spanning the fluid inlet, wherein a first end of the porous element abuts the first end plate and a second end of the porous element abuts the second end plate, the porous element effective to collect a liquid water from the reactant gas flowing therethrough, the porous element disposed in an inlet header adjacent an inlet to a flow field of the fuel cell; and
   providing a fluid collection member extending from a surface of one of the first end plate and the second end plate and disposed in the fluid inlet directly adjacent the porous element, the fluid collection member adapted to receive the liquid water from the porous element.

20. The method of claim 19, further comprising the step of draining the liquid water from the fluid collection member.

* * * * *